United States Patent
Karlsson et al.

(10) Patent No.: US 10,018,233 B2
(45) Date of Patent: Jul. 10, 2018

(54) AUTOMATIC CLUTCH CALIBRATION

(71) Applicant: VOLVO TRUCK CORPORATION, Göteborg (SE)

(72) Inventors: Lars Karlsson, Göteborg (SE); Johan Bjernetun, Mölnlycke (SE)

(73) Assignee: Volvo Truck Corporation, Göteborg (SE)

( * ) Notice: Subject to any disclaimer, the term of this patent is extended or adjusted under 35 U.S.C. 154(b) by 96 days.

(21) Appl. No.: 14/900,715

(22) PCT Filed: Jun. 27, 2013

(86) PCT No.: PCT/EP2013/001884
§ 371 (c)(1),
(2) Date: Dec. 22, 2015

(87) PCT Pub. No.: WO2014/206428
PCT Pub. Date: Dec. 31, 2014

(65) Prior Publication Data
US 2016/0160943 A1 Jun. 9, 2016

(51) Int. Cl.
*F16D 48/06* (2006.01)
*G07C 5/00* (2006.01)

(52) U.S. Cl.
CPC ............ *F16D 48/06* (2013.01); *G07C 5/006* (2013.01); *G07C 5/008* (2013.01);
(Continued)

(58) Field of Classification Search
CPC ................ Y10T 477/78; F16D 48/06; F16D 2500/30408; F16D 2500/1045;
(Continued)

(56) References Cited

U.S. PATENT DOCUMENTS

| 4,660,697 A | 4/1987 | Yoneda et al. |
| 5,335,174 A * | 8/1994 | Kohno .................. F16D 48/02 192/75 |

(Continued)

FOREIGN PATENT DOCUMENTS

| DE | 103 55 253 A1 | 6/2004 |
| DE | 10 2010 023374 A1 | 1/2011 |

(Continued)

OTHER PUBLICATIONS

English translation of EP1878933 (equivalent of DE10355253A1), translationportal.epo.org, May 24, 2017.*
(Continued)

*Primary Examiner* — Roger L Pang
(74) *Attorney, Agent, or Firm* — WRB-IP LLP

(57) ABSTRACT

A method for automatic detection of need for clutch calibration includes registering and storing in a data memory, before or in connection with engine shut down, a value of a clutch operating parameter, registering a corresponding value of the clutch operating parameter in connection with subsequent engine start up, and determining need for clutch calibration if the difference between the stored value of the clutch operating parameter and the corresponding value of the clutch operating parameter exceeds a predetermined threshold value.

20 Claims, 6 Drawing Sheets

(52) U.S. Cl.
CPC ............... *F16D 2500/1045* (2013.01); *F16D 2500/1083* (2013.01); *F16D 2500/304* (2013.01); *F16D 2500/3026* (2013.01); *F16D 2500/3069* (2013.01); *F16D 2500/30406* (2013.01); *F16D 2500/30408* (2013.01); *F16D 2500/5018* (2013.01); *F16D 2500/50233* (2013.01); *F16D 2500/50236* (2013.01); *F16D 2500/50245* (2013.01); *F16D 2500/50269* (2013.01); *F16D 2500/50275* (2013.01); *F16D 2500/50281* (2013.01); *F16D 2500/5116* (2013.01); *F16D 2500/70605* (2013.01); *Y10T 477/78* (2015.01)

(58) Field of Classification Search
CPC ..... F16D 2500/304; F16D 2500/30406; F16D 2500/07605; F16D 2500/50275; F16D 2500/50269; F16D 2500/50245; F16D 2500/5018; F16D 2500/3069; F16D 2500/3023; F16D 2500/5116; F16D 2500/50233; F16D 2500/50236; F07C 5/006; G07C 5/006
USPC ............................................................ 701/68
See application file for complete search history.

(56) References Cited

U.S. PATENT DOCUMENTS

| | | | |
|---|---|---|---|
| 5,337,874 | A | 8/1994 | Oltean et al. |
| 6,604,057 | B1 | 8/2003 | Eden et al. |
| 6,971,971 | B2 | 12/2005 | Duskunovic et al. |
| 7,574,296 | B2 | 8/2009 | Baehr et al. |
| 8,577,570 | B2 * | 11/2013 | Ellis ................ B60W 10/02 701/67 |
| 2010/0056336 | A1 * | 3/2010 | Zdych ................ F16D 48/06 477/179 |
| 2010/0204010 | A1 * | 8/2010 | Petzold ................ F16D 48/06 477/174 |
| 2011/0024258 | A1 * | 2/2011 | Avny ................ F16D 13/72 192/111.12 |
| 2012/0067690 | A1 * | 3/2012 | Postic ................ F16D 48/066 192/85.63 |
| 2012/0322618 | A1 * | 12/2012 | Reibold ................ F16D 48/06 477/180 |

FOREIGN PATENT DOCUMENTS

| | | |
|---|---|---|
| DE | 10 2011 080713 A1 | 3/2012 |
| EP | 0461578 A1 | 12/1991 |
| EP | 2011708 A1 * | 1/2009 |
| JP | S6098822 A | 6/1985 |
| JP | H04046225 | 2/1992 |

OTHER PUBLICATIONS

International Search Report (Mar. 3, 2014) for corresponding Intenrational App. PCT/EP2013/001884.
International Preliminary Report on Patentability (Sep. 15, 2015) for corresponding Intenrational App PCT/EP2013/001884.
Chinese Official Action (Jun. 1, 2017) for corresponding Chinese Patent App. 201380077798.3.
Japanese Official Action (Mar. 8, 2017) for corresponding Japanese Patent Application No. 2016-522277.
Chinese Official Action (Jan. 19, 2018) for corresponding Chinese Patent App. 201380077798.3.

* cited by examiner

AUTOMATIC CLUTCH CALIBRATION

BACKGROUND AND SUMMARY

This disclosure relates to a method for automatic detection of need for clutch calibration. The disclosure also relates to a clutch system that automatically detects need for clutch calibration. The disclosure is particularly advantageous in the field of friction clutch systems for vehicles.

In automated manual transmissions AMT having a single or double clutch the clutch is operated by an electromechanical clutch actuator and gear shift operations within the gearbox are performed by one or more electromechanical shift actuators. The electromechanical actuators are controlled by an electronic control unit, which controls the shift positions fully automatically. To ensure smooth and jerk-free gear changes it is important that the control unit has access to correct operating parameters of the clutch and transmission for controlling the electromechanical actuators using correct timing and power magnitude. Document US 2005/0192155 A1 for example concerns adaptation of engaging an automated clutch for the clutch of a new vehicle, or after clutch maintenance, service or repair. There is however always a risk that the adaptation of the clutch is not performed after clutch maintenance, service, or repair such that the driving comfort is reduced due to non-smooth gear changes. There is thus a need for an improved solution removing, the above mentioned disadvantages.

It is desirable to provide a method for detecting the need for clutch calibration, such that the previously mentioned problem can be avoided.

The disclosure concerns a method for automatic detection of need for clutch calibration. The method comprises the steps of:
  registering and storing in a data memory, before or in connection with engine shut down, a value of a clutch operating parameter;
  registering a corresponding value of the clutch operating parameter in connection with subsequent engine start up; and
  determining need for clutch calibration if the difference between the stored value of a clutch operating parameter and the corresponding value of a clutch operating parameter exceeds a predetermined threshold value.

The idea is to detect if the clutch characteristics have substantially changed between engine shut down and engine start up, by comparing a value of a clutch operating parameter stored before or in connection to shut down with a corresponding value of a clutch operating parameter registered at the subsequent engine start up. The reason for the clutch characteristics to substantially change between an engine shut down and an engine start up is usually that one or more plates of the clutch, such as one or more clutch plates, the pressing plate or the support plate, have been exchanged. Clutch plates wear during take-off and gear shifts and have to be regularly replaced. The replacement is done with the vehicle engine shut down. However, the replacement of a worn clutch plate with a new plate substantially changes the clutch characteristics. Primarily the clutch actuating positions are displaced, e.g. the clutch engagement or disengagement position at which the clutch starts and stops to transmit torque respectively, as well as the position where the clutch is fully engaged. Fully engaged refers to the maximum degree of torque transfer of a clutch in the specific clutch configuration of the drive train in question. The maximum degree of torque transfer depends for example on the magnitude of the clamping force that forces the clutch plates towards each other.

When the clutch characteristics have changed substantially, as is normally the case when a clutch plate has been replaced, clutch calibration is needed for adapting the control system to the increased clutch plate thickness, such that good driving comfort at gear shifts is obtained and such that the risk of the engine stalling or having high propulsion torque without accelerator actuation when a gear is engaged is avoided. Having high torque without accelerator actuation is highly dangerous since the vehicle unintentionally may move forwards or backwards, risking to hit someone or to run into something. If a clutch plate is replaced by an authorised technician, a subsequent clutch calibration process is generally commanded by the technician. However, there is always a risk that the authorised technician for some reason misses out the calibration, or that the replacement of the clutch plate is performed by a non-authorised person who does not have knowledge about the required calibration or for some other reason misses out the calibration. And, as explained above, missing out the clutch calibration after clutch plate replacement may have severe consequences. One advantage of the disclosed method is that it provides automatic detection of the need for clutch calibration at start up of the engine, thus reducing the risk of accidents and/or the engine stalling due to incorrect clutch calibration. Since a clutch plate exchange in theory could take place during any stand still, the method is preferably applied in connection to every engine shut down and start up.

The disclosure further concerns a corresponding computer program, a corresponding computer program product, and a corresponding computer system for implementing the method. The disclosure also concerns a corresponding clutch system comprising a friction clutch and an electronic control unit, wherein the control unit is programmed to automatically detect need for clutch calibration by performing the steps of:
  registering and storing in a data memory, before or in connection with engine shut down, a value of a clutch operating parameter;
  registering a corresponding value of a clutch operating parameter in connection with subsequent engine start up; and
  determining need for clutch calibration if the difference between the stored value of a clutch operating parameter and the corresponding value of a clutch operating parameter exceeds a predetermined threshold value.

Further advantages are achieved by implementing one or several features of other aspects of the invention.

The selected clutch operating parameter is preferably more or less sensitive to the wear condition of the clutch, in particular to a wear condition of at least one of a clutch plate, pressing plate or support plate. The more wear sensitive selected clutch operating parameter the more accurate and reliably can the need for clutch calibration be determined.

The value of the clutch operating parameter is preferably derived from a clutch actuating position along the clutch characteristic curve. The clutch actuating position is good and relatively easily registered indicator of the clutch wear condition. Preferably, the clutch operating parameter corresponds directly to the clutch actuating position along the clutch characteristic curve.

The stored value of the clutch operating parameter of the disclosed method may be derived from any of the clutch engaged position, the clutch engagement position, or the clutch disengagement position. In the clutch engaged position, the support and pressing plates of the clutch abut against each other, usually via an intermediate clutch plate, and the torque transmitting capability of the clutch is at its maximum. The clutch engagement position is the physical position at which an initially disengaged clutch being actuated starts to transmit torque. And vice versa, the clutch disengagement position is the physical position at which an initially engaged clutch being disengaged stops to transmit torque. The clutch engagement position and the clutch disengagement position may correspond to the same physical position of the pressing plate, but if hysteresis effects are present, they will correspond to separate positions. Preferably, the clutch engaged position is used in the disclosed method, since the clutch engaged position is quick and easy to find. Finding the clutch engagement or disengagement position is also possible, but requires for example a pressure sensor in connection to the clutch plates for detecting the clutch plate clamping pressure. In a clutch disengaged state, the clutch plate clamping pressure is zero. If starting in a disengaged state and moving the pressing plate towards the support plate, the clutch engagement position is reached at the moment when the pressure sensor detects a clutch plate clamping pressure larger than zero. In order to find the disengagement position, it is suitable to start in a clutch engaged state, where the clutch clamping pressure is large, and move the pressing plate way from the support plate. The clutch disengagement position is found as the pressure sensor detects that the clutch plate clamping pressure has reached zero.

Another possible way of finding the clutch engagement or disengagement positions is to use an angular sensor which is sensitive to the rotational speed of the input shaft of the transmission of the vehicle, i.e. the shaft downstream the master clutch of the drive train. The clutch engagement position can be found by the following procedure: Start with the clutch in its disengaged state and the input shaft stationary, i.e. non-rotating, and the crankshaft, i.e. the shaft upstream the master clutch, rotating. Move the pressing plate towards the support plate. As the clutch starts to transfer torque, torque will be transferred from the crankshaft to the input shaft which will start to rotate. Consequently, it can be concluded that the clutch has reached its engagement position at the moment the rotation sensor detects that the input shaft starts to rotate. For finding the clutch disengagement position, an additional rotation sensor sensitive to the rotational speed of the crankshaft is needed. Initially, the clutch should be in its engaged state and the crankshaft and the input shaft should rotate at a common speed separate from zero, i.e. the two rotation sensors should read the same value. The pressing plate is moved away from the support plate. As the clutch ceases to transfer torque, the input shaft will start to decelerate and its rotational speed will start to differ from the speed of the crankshaft. Consequently, it can be concluded that the clutch has reached its disengagement position at the moment the rotation sensors starts to detect different rotational speeds of the crankshaft and input shaft respectively. During the described procedures for finding the clutch engagement and disengagement positions by using rotation sensors, the input shaft has to be disconnected from the gear box output shaft in order for the vehicle to remain stationary. Alternatively, the stored clutch actuating position may correspond to a certain engagement pressure and/or a certain torque transfer value. The engagement pressure corresponds to the aforementioned clutch plate clamping pressure and can be measured with a pressure sensor in connection to the clutch plates. Said torque transfer value may be measured with a torque sensor, for example a strain gauge, mounted on the input shaft of the transmission.

A strain gauge measures the deformation of the input shaft, from which deformation the torque is deduced.

The method may also comprise performing an automatic clutch calibration if a need for clutch calibration has been determined. The need for calibration is not just detected, but the required calibration is also completed. Hence, the aforementioned risks and inconveniences associated with an uncalibrated clutch are eliminated.

Furthermore, the method may comprise performing the automatic clutch calibration before enabling use of the clutch for transmitting driving torque. The advantage is automatic elimination of the aforementioned risks and inconveniences that comes from driving with an uncalibrated clutch.

The method may comprise performing the automatic clutch calibration by updating at least one stored clutch control parameter with a value corresponding to the determined difference between the stored value of the clutch operating parameter and the corresponding value of the clutch operating parameter. This is equivalent to adapting the clutch control parameter to the new clutch characteristics. For example, the stored clutch control parameter may be any of the stored clutch engagement position, the stored clutch disengagement position or the stored clutch engaged position. Preferably, all these clutch control parameters are updated during the clutch calibration.

Alternatively, the method may comprise performing the automatic clutch calibration by updating, and displacing a stored complete clutch characteristic curve. A clutch characteristic curve comprises all possible clutch actuating positions of the clutch. Consequently, this provides a more comprehensive calibration of the clutch than updating separate clutch control parameters.

Instead of automatic clutch calibration, the method may comprise signalling clutch calibration need to a driver of the vehicle and/or sending information concerning clutch calibration need to a remote party if a need for clutch calibration has been determined. This might be a good alternative if for example automatic clutch calibration is not available for the vehicle. The driver or a remote party such as vehicle fleet management or vehicle producer becomes aware of the fact that the clutch needs calibration, and may take necessary action to ensure that clutch calibration is indeed carried out.

If a need for clutch calibration has been determined the clutch control may alternatively, or preferably in combination with said signalling and/or sending information concerning clutch calibration need, be set in a safety operation mode where the output signal from the position sensor is disregarded. Thereby the vehicle can be used with a degraded performance despite the need for a clutch calibration but without the imminent risk for accidents and discomfort.

The clutch actuating position may be registered by a position sensor that is arranged to register the position of an axially displaceable pressure plate or a member of a clutch actuating mechanism that is arranged to generate the axial displacement of the pressure plate. This can be accomplished in several ways. The position sensor may either be integrated in the clutch actuating mechanism, or operated as a standalone element that senses either the position of the pressure plate directly or indirectly by sensing the position of the clutch actuating mechanism member, e.g. a piston rod that acts upon the pressure plate.

The method may comprise performing at least one additional disengagement-engagement sequence if the difference between the stored value of the clutch operating parameter and the corresponding value of the clutch operating parameter is within a predetermined range, and subsequently registering a new corresponding value of the clutch operating parameter. If the clutch has been removed and put back again, without the exchange of any plates, the position sensor of the clutch may read a more engaged position than it should. This may result in a difference between the stored clutch actuating position and the corresponding clutch actuating position within a predetermined range. The predetermined range may for example be 0.3-2 millimeters, preferably 0.3-1.5 millimeters, and more preferably 0.3-1 millimeters. If the detected difference in clutch actuating position is within the predetermined range, this is an indication of that no plate has been exchanged, but merely that the existing plates and/or the position sensor have been brought slightly out of position. To correct the reading of the position sensor, the clutch is disengaged/engaged a number of times in order to bring the clutch components and the sensor to their correct positions. After that, a corresponding clutch actuating position is registered again. The advantage of additional disengagement-engagement sequences is thus to correct deviations in the clutch position reading emanating from the act of removing and reinstalling the clutch. All absolute values relate to the position of the pressing plate.

The method may further comprise registering the value of the clutch operating parameter at each clutch engagement and/or disengagement occurrence. In such way, a fairly recent value of the clutch operating parameter is always stored at engine shut down, no matter when and how the engine shut down takes place and no additional measurement of the value of the clutch operating parameter must be performed in connection to engine shut down. The alternative is to have a specific procedure for registering and storing the value of the clutch operating parameter just before or concurrent with engine shut down.

The method may also comprise regularly updating the stored value of the clutch operating parameter based on an average value calculated using a set of recently registered values of the clutch operating parameter. Using an average value reduces the effects of measurement errors and white noise in the stored value of the clutch operating parameter.

The predetermined threshold value used for determining the need for clutch calibration may be larger than 1 millimeter, preferably larger than 2 millimeters, more preferably larger than 3 millimeters, and even more preferably larger than 4 millimeters. A higher threshold increases the risk of failing to discover that a clutch plate replacement has been performed and that a clutch calibration is required. A lower threshold increases the frequency of calibrations although no clutch replacement was performed. All absolute values relate to the position of the clutch actuator.

BRIEF DESCRIPTION OF DRAWINGS

In the detailed description of the disclosure given below reference is made to the following figures, in which.

DETAILED DESCRIPTION

Various aspects of the disclosure will hereinafter be described in conjunction with the appended drawings to illustrate and not to limit the disclosure, wherein like designations denote like elements. Variations of the described aspects are not restricted to the specifically shown embodiments, but are applicable on other variations of the disclosure.

Figure 1:
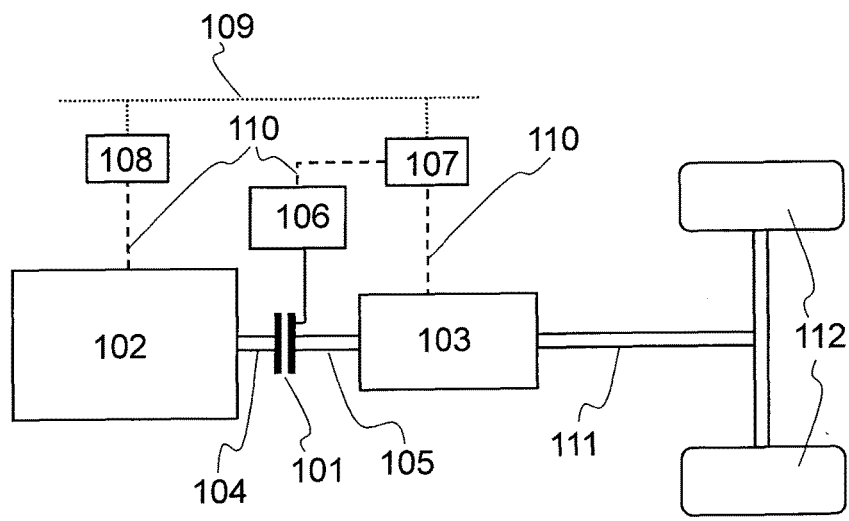
FIG. 1 shows a schematic overview of a drive train of a vehicle.

FIG. 1 shows a schematic overview of an example of a drive train in a vehicle. A clutch 101 is situated between the engine 102 and the gear box 103, connecting the crankshaft 104 of the engine 102 to the rotatable input shaft 105 of the transmission of the vehicle. An output shaft 111 connects the gear box with the driving wheels 112 of the vehicle. When the clutch 101 is in an engaged position, it transfers torque between the crankshaft 104 and the input shaft 105, and when the clutch 101 is in a disengaged position, the crankshaft 104 and the input shaft 105 are decoupled from each other and no torque is transferred between them. The position of the clutch 101 is set by a clutch actuating mechanism 106. The clutch actuating mechanism 106 is in turn controlled by an electronic control unit 107. An engine control unit 108 controls the engine 102. The two control units 107; 108 communicate with each other for example via a controller area network (CAN) bus 109. Further, the electronic control unit 107 is connected to the clutch actuator mechanism 106 and the gear box 03 and the engine control unit 108 is connected to the engine 102 via signal cables 110. Alternatively, both the engine 102, clutch 101, and gear box 103 may be controlled by a single control unit.

Figure 2:
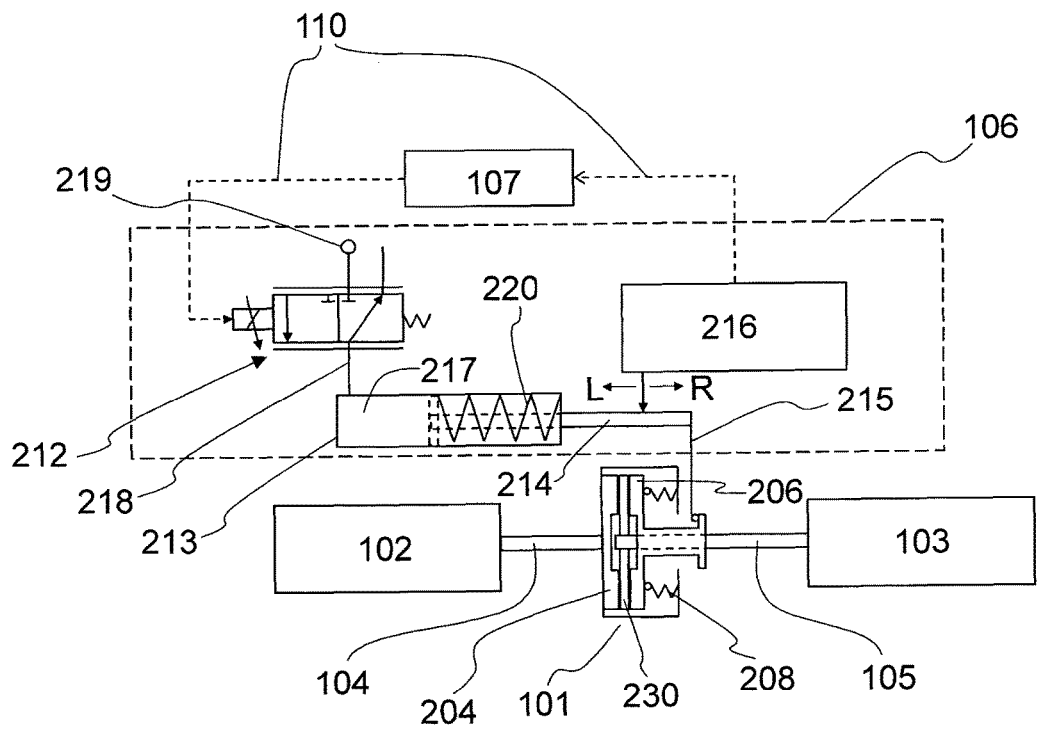
FIG. 2 shows a schematic layout of a clutch and a clutch actuating mechanism.

FIG. 2 shows an example of a schematic layout of a clutch 101 and a clutch actuating mechanism 106. The friction clutch 101 is situated between the engine 102 and the gear box 103 of the vehicle. The friction clutch comprises a support plate 204 which is fixedly mounted to a rotatable crankshaft 104 of the engine 102, and a pressing plate 206 which is rotationally fixed but axially movable on a rotatable transmission input shaft 105 connected to the gear box 103. In between the support plate 204 and the pressing plate 206 is a clutch plate 230, the purpose of which is to increase the friction between the support plate 204 and the pressing plate 206 as the clutch 101 is engaged. The clutch plate 230 is axially slidable and rotationally fixed to the transmission input shaft 105, for example via splines. The clutch plate 230 may have friction discs or linings on each side as wear surfaces. The clutch is here passively engaged by means of the pressure from at least one spring 208. The clutch may for example he engaged by means of a plurality of angular spaced apart coil springs, a diaphragm spring or another type of spring. The at least one spring 208 presses the pressing plate 206 towards the support plate 204. Unless a force is applied in the opposite direction, the at least one spring 208 will cause the pressing plate 206 to abut against the support plate 204, via the clutch plate 230, such that torque may be transmitted from through surface friction between the faces of the plates 204, 206, 230.

The clutch 101 is actuated by a clutch actuating mechanism 106 which is connected to an electronic control unit 107 via signal cables 110. When the clutch is to be disengaged, the electronic control unit 107 sends a signal to a directional control valve 212. Upon receipt of the signal, the spool of the directional control valve 212 switches position from a normal position to a working position. In the normal position, air in a working chamber 217 of the clutch actuator is allowed to escape via a control line 218, the directional control valve 212, and subsequently out of the system. In the working position, compressed air from a compressed air source 219 is supplied to the piston side of the clutch actuator, thereby feeding compressed air into a single-acting cylinder serving as a clutch actuator 213. The compressed air presses against a piston rod 214, forcing the piston rod 214 to move in, as seen in FIG. 2, a rightward direction R. A connection member 215 transfers the rightward motion from the piston rod 214 to the pressing plate 206, and the pressing plate 206 is consequently moved away from the support plate 204. The result is that the clutch becomes partly or completely disengaged, the degree of disengagement depending, on how far the pressing plate 206 is moved away from the support plate 204.

Correspondingly, when the clutch is to be engaged, the clutch control unit 107 commands the directional control valve 212 to release compressed air from the clutch actuator 213. As the pressure from the compressed air is reduced, the piston rod 214 is pressed back into the clutch actuator by an actuator internal spring 220 and/or the spring 208 of the clutch, the piston rod 214 thus moving in leftward direction L.

Alternatively, a directional control valve being able to feed compressed air into both ends of a double-acting cylinder serving as clutch actuator 213 may be used. The internal spring 220 would in such case be superfluous, as the piston rod 214 would be forced in leftward direction L by feeding compressed air into the rightward end of the clutch actuator 213 cylinder while allowing air in the working chamber 217 escaping via the control line 218. In order to force the piston rod 214 in rightward direction R, compressed air is supplied to the working chamber 217 while allowing air to escape from the rightward end of the clutch actuator cylinder via an additional control line (not shown in the figure).

The position of the pressing plate 206 along the axis of the transmission shaft 105 is monitored by means of a position sensor 216 that detects the position of the piston rod 214 of the clutch actuator 213 and feeds the information to the electronic control unit 107. The position of the piston rod 214 is directly linked to the position of the pressing plate 206 since they are interconnected by a rigid connection member 215. The position sensor 216 is preferably, but not necessarily, a linear position sensor. Alternatively, the position sensor may monitor the position of the pressing plate 206 directly, or the position of the connection member 215.

The method of this disclosure concerns automatic detection of need for clutch calibration, i.e. calibration of the control algorithm of the electronic control unit 107. Calibration is always needed when a clutch plate 230, a support plate 204, or a pressing plate 206 has been replaced since the characteristics of a new plate substantially differ from the characteristics of a worn plate. In the following detailed description the clutch actuating position will be used as wear indicating clutch operating parameter. The clutch actuating positions are displaced since the friction surfaces of especially clutch plates 230 but also of support and pressing plates 204, 206 are gradually worn off during use and the thickness of the plate 230, 204, 206 is reduced. A clutch actuating position is a physical position of the pressing plate 206 in an axial direction in which a certain torque transmitting capability is obtained. In order to detect need for calibration, the position sensor 216 measures a clutch actuating position of the pressing plate 206 before or in connection to engine 102 shut down. The clutch actuating position is registered and stored in a data memory in the electronic control unit 107. In another example of the disclosure, the data memory could be located elsewhere than in the electronic control unit 107, but preferably it should be located on-board the vehicle in question. In connection with subsequent start up of the engine 102, the position sensor 216 measures the corresponding clutch actuating position. The actual measurement may here be performed before or after engine start up, for example after clutch control power up but before engine start up. The corresponding clutch actuating position is the physical position of the pressing plate 206 that provides substantially the same torque transmitting capability as in the measurement before engine 102 shut down. However, the physical position of the pressing plate may not be the same for the corresponding clutch actuating position as for the clutch actuating position measured before engine 102 shut down. If a clutch plate 230, a support plate 204, or a pressing plate has been exchanged, the physical positions normally differ from each other. Advantageously, the clutch actuating position is constituted by the clutch engaged position p13, p23 which is very fast and easy to find in a passively engaged clutch—command the directional control valve 212 to release all the compressed air from the clutch actuator 213, and the spring 208 will force the pressing plate 206 into the clutch engaged position where it abuts against the support plate 204 via the clutch plate 230.

The electronic control unit 107 then compares the corresponding clutch actuating position measured at engine start up to the clutch actuating position stored in its data memory. If the difference exceeds a predetermined threshold value, the electronic control unit 107 determines that clutch calibration is needed. In a further development of the disclosed method, the control algorithm of the electronic control unit 107 is automatically calibrated if need is detected. One or more clutch control parameters are updated with a value corresponding to said difference, or the complete clutch characteristic curve see FIG. 3) is updated. Instead of performing an automatic calibration, the electronic control unit 107 may signal the need of calibration to the driver or to a remote party. If the remote party is distant, the information can be sent via e.g. telematics.

Figure 3:
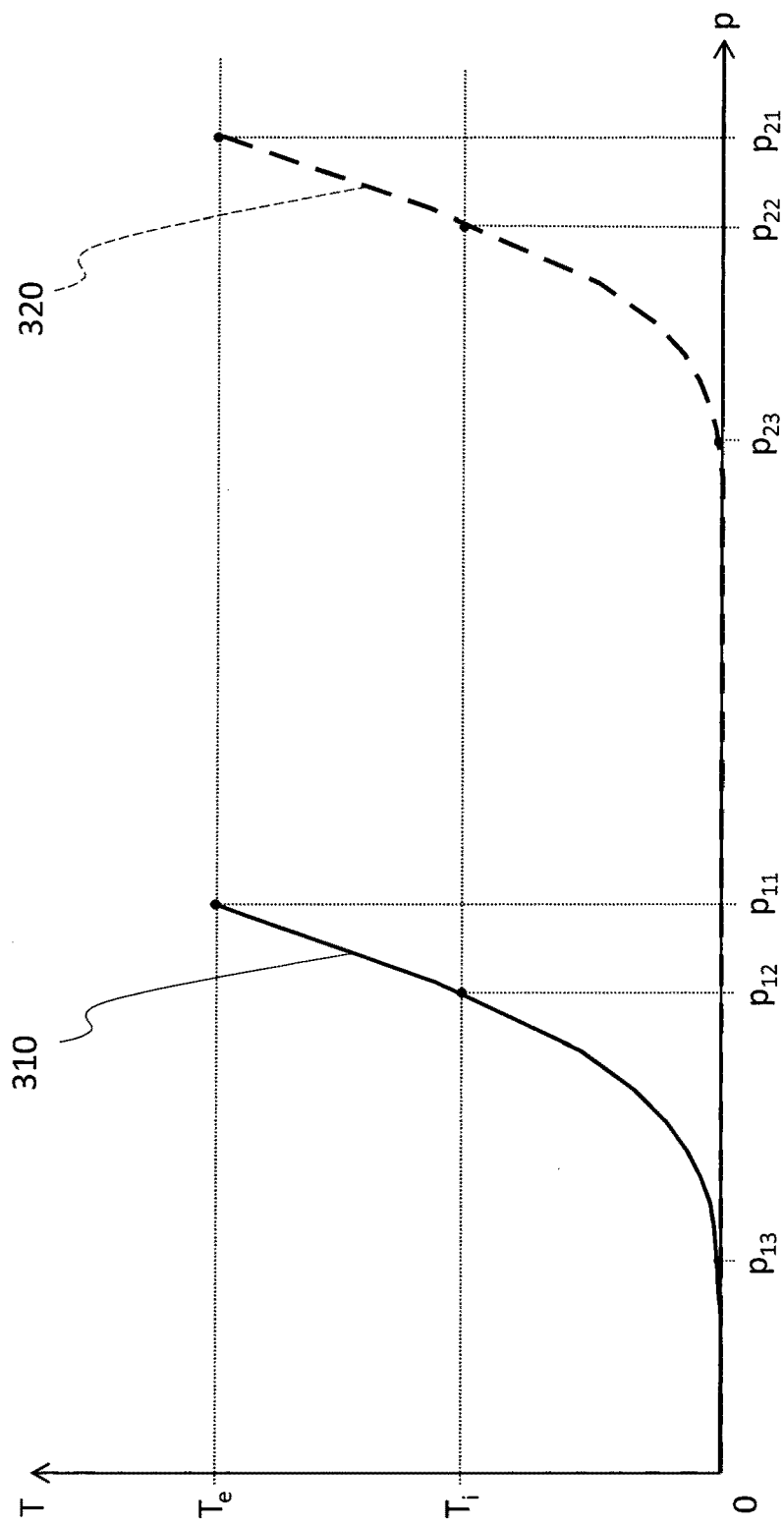
FIG. 3 shows exemplary clutch characteristic curves of a new and a worn clutch respectively.

FIG. 3 shows a graph of exemplary clutch characteristic curves, i.e. the torque transfer T as a function of the position p of the pressing plate 206, of a clutch. At T=0, the clutch 101 is disengaged and transfers no torque. As can be seen in the graph, no torque T is transferred at p=0, i.e. the clutch 101 is disengaged and its pressing plate 206 is in a predefined position in which it is sure not make contact with the support plate 204. At increasing distance d, the pressing plate 206 moves away from the disengaged position towards the support plate 204. The solid curve 310 represents a clutch 101 with new plates 204, 206, 230, while the dashed curve 320 represents a worn clutch 101. As can be seen, the curves 310, 320 are substantially identical in shape, but displaced relative to each other along the p-axis. This is due to the fact that in a worn clutch, the friction surfaces of the support and pressing plates 204, 206 and especially of the clutch plate 230 have been worn off and consequently the pressing plate 206 has to be moved a further distance towards the support plate 204 before reaching the clutch engagement position p23, i.e. the position at which the support and pressing plates 204, 206 make contact via the clutch plate 230 and start to transmit torque. The clutch engagement position p13 of the new clutch corresponds to a smaller movement of its pressing plate 206. In the clutch engaged position p11, p21 the pressing plate 206 firmly abuts against clutch plate 230 which in turn firmly abuts against the support plate 204 such that the clutch 101 reaches its maximum torque transfer capacity Te. Both the clutch engagement positions P13, P23 and the clutch engaged positions p11, p21 can be used as clutch actuating positions in the disclosed method of automatically detecting need for calibration, as well as intermediate positions p12, p22 which correspond to a predefined torque transfer value Ti. Such intermediate positions p12, p22 can be found by using for example a torque sensor which notices the torque of the input shaft 105, or indirectly by using a pressure sensor which notices the clutch clamping pressure. Imagine a vehicle with a worn clutch 101 with characteristics represented by the dashed curve 320. Before engine 102 shut down, a clutch actuating position in terms of the clutch engaged position p21 is registered and stored. While the engine 102 is shut down, the worn clutch plate 230 and perhaps also the support and pressing plates 204, 206 are replaced with brand new plates. With new plates, the characteristics of the clutch 101 changes so that it now is represented by the solid curve 310. However, the clutch control algorithm has not been recalibrated. At engine start up, the clutch engaged position p-n is measured again, however with another measurement result since the clutch characteristics has changed since last measurement. If the difference between the two measured clutch engaged positions p21, p exceeds a predetermined threshold value, it is determined that clutch calibration is needed. Clutch calibration could be automatic and may comprise displacing at least one of the stored clutch actuating positions p21, p22, p23 with the calculated difference, so that the updated positions overlap with corresponding positions p11, p12, p23 for the new clutch. An alternative is to displace the entire stored clutch characteristics curve 320 by said difference, such that the updated clutch characteristics curve overlap with the solid clutch characteristic curve 310 of the new clutch. The most suitable calibration depends on how the clutch control is realized in practice.

Figure 4:
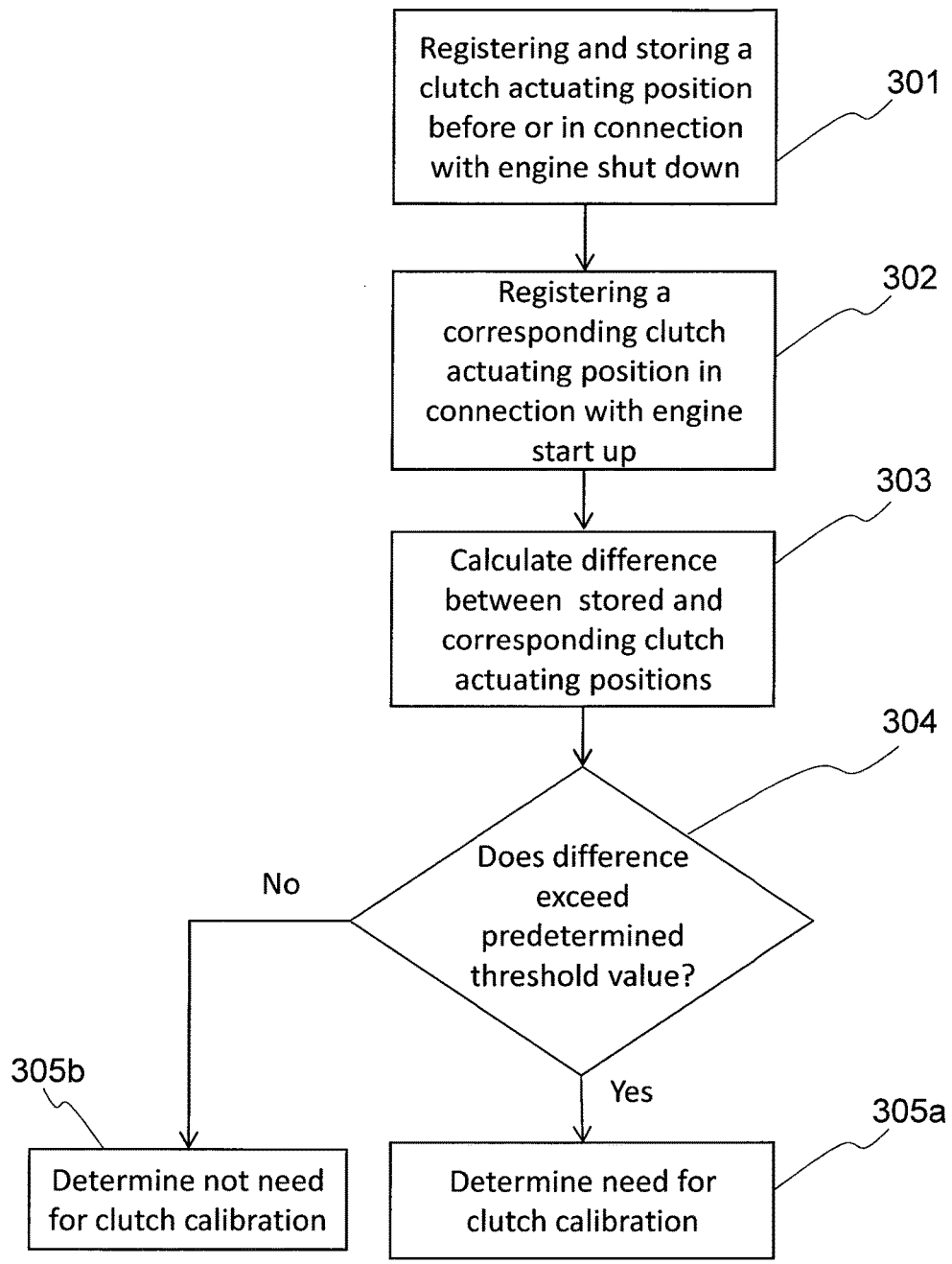
FIG. 4 shows a process map of the disclosed method for automatic detection of need for clutch calibration.
Figure 5:
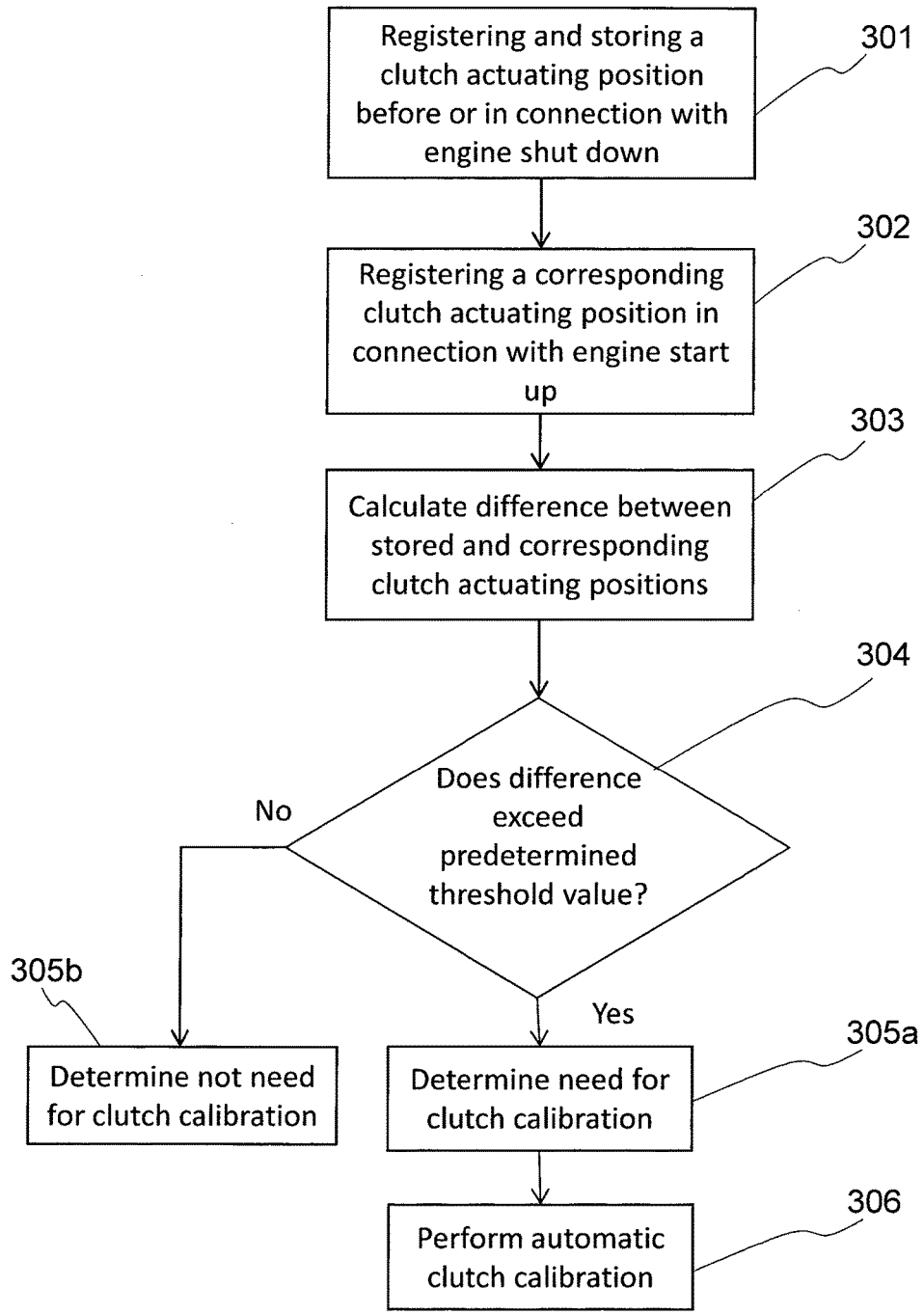
FIG. 5 shows a process map of the disclosed method for automatic detection of need for clutch calibration with the additional step of performing an automatic clutch calibration.
Figure 6:
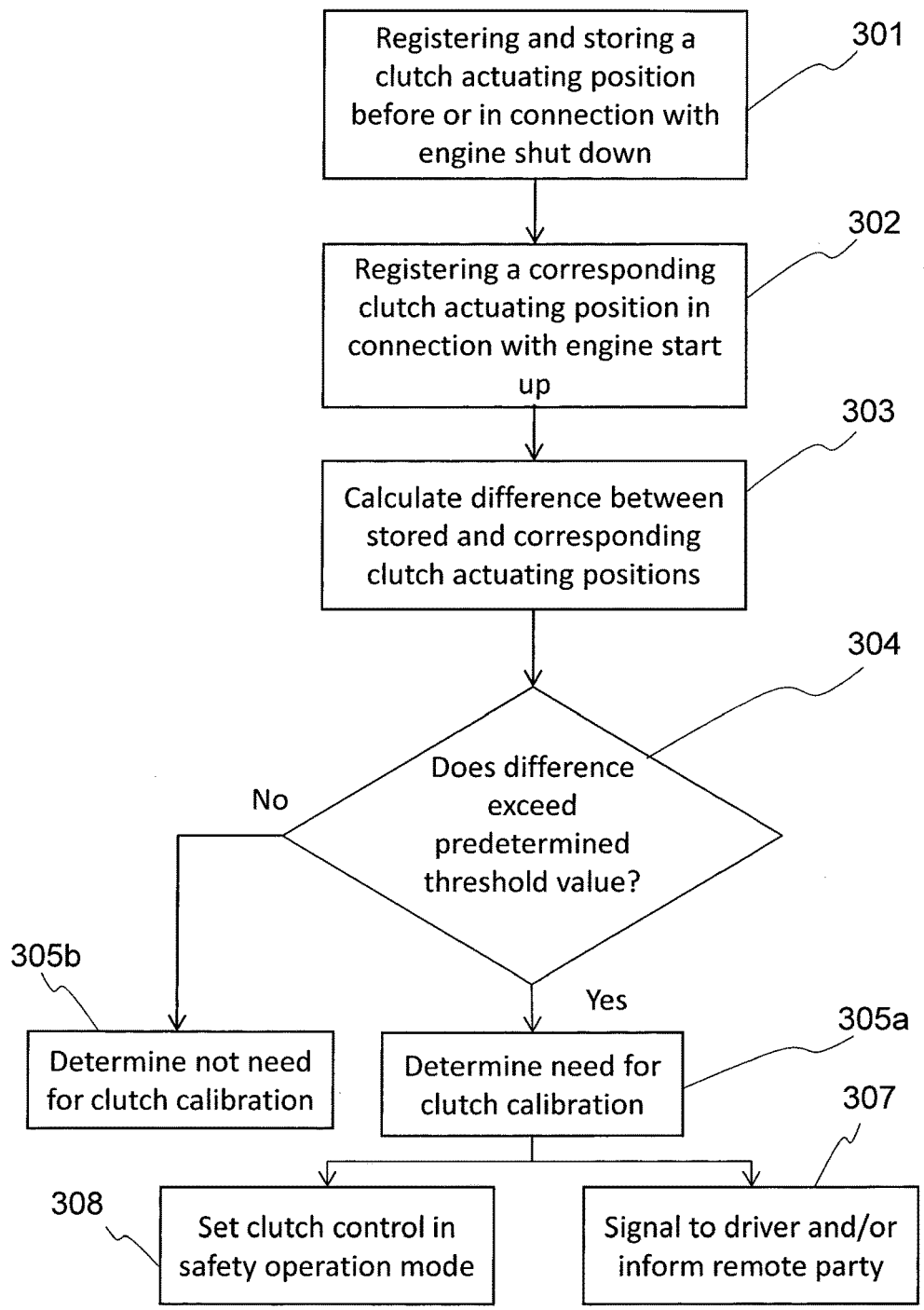
FIG. 6 shows a process map of the disclosed method for automatic detection of need for clutch calibration with the additional step of informing the driver and/or a remote party.

FIG. 4-6 show different versions of a process map for automatic detection of need for clutch calibration according to the disclosure. The different versions are all disclosed having the clutch actuating position as exemplary clutch operating parameter, but the disclosure is not limited to having the clutch actuating position as value of the clutch operating parameter and other parameters may be used. FIG. 4 shows an exemplary process map of the disclosed method for automatic detection of need for clutch calibration. The first step 301 comprises registering and storing a clutch actuating position before or in connection to engine shut down. There may for example be a specific procedure for registering and storing the clutch actuating position concurrent with engine shut down, or the clutch actuating position may be registered and stored at each clutch engagement occurrence such that when the engine is shut down. Still more alternatively, the clutch actuating position may be registered and stored during engine start-up because the level of wear between consecutive engine start-ups is generally very small. The clutch actuating position stored in the data memory is derived from the most recently registered clutch engagement or engaged position. It is also possible to register several subsequent readings of the clutch actuating position and base the stored clutch actuating position on an average value of a set of recently registered readings. Details on how to identify clutch engagement or disengagement position can be found for example in WO 2012/083976, pages 18-22. After the first step 301, the vehicle engine is kept turned off for an undefined period of time—it could be just an instant or a longer period such as days or weeks or even longer. During this period of time, plates in the clutch may or may not be exchanged. In the second step 302, the engine is restarted and a corresponding clutch actuating position is registered. The third step 303 comprises calculating the difference, for example in millimeters, between the clutch actuating position stored in the first step 301 and the corresponding clutch actuating position registered in step 302. The fourth step 304 comprises determining if the difference calculated in the third step 303 exceeds a predetermined threshold value. The predetermined threshold value is normally in the range of millimeters. Exceeding the threshold value indicates that the clutch characteristics have changed substantially since last drive, which is usually the case if the plates in the clutch have been exchanged, and a clutch calibration is thus required. If the answer to the question "Does the difference exceed a predetermined threshold value?" is yes, a fifth step 305a concludes that clutch calibration is needed. If the answer is no, the next step is an alternative fifth step 305b of concluding that clutch calibration is not needed.

FIG. 5 shows the process map of FIG. 4 with an additional sixth step 306 of performing an automatic clutch calibration following upon the fifth step 305a of determining that clutch calibration is needed.

FIG. 6 shows the process map of FIG. 4 with an additional sixth step 307 of informing the driver and/or a remote party following upon the fifth step 305a of determining that clutch calibration is needed. The information that clutch calibration is needed can be communicated to the driver via for example a signal lamp or warning text on the instrument panel or an audio signal in the driver's cabin. To a remote party, the information can be communicated via e.g. telematics. The method may further include a seventh step 308 to be performed as alternative or in combination with the sixth step 307. The seventh step 308 involves controlling clutch operation according to a safety operation mode if a need for clutch calibration has been determined. This means that control of the clutch engagement and disengagement sequences are performed without taking into account the output signal of the position sensor 216. This may be realized by using signal output of at least one angular speed sensor of a shaft of the gearbox. For example, upon controlling the clutch actuator 213 to set the clutch in a non-engaged state the angular speed of the gearbox shaft will likely start slowing down due to the disconnected engine. Consequently, upon detecting decreased angular speed this may be used as an indication of clutch in a non-engaged state. Similarly, the engaging sequence may also be performed without the input from the position sensor 216, i.e. by an open loop control without any feedback. Such clutch engagement sequence is generally performed significantly slower than a feedback clutch engagement sequence but still with certain level of driver comfort and substantially without the risk for an accident.

Figure 7:
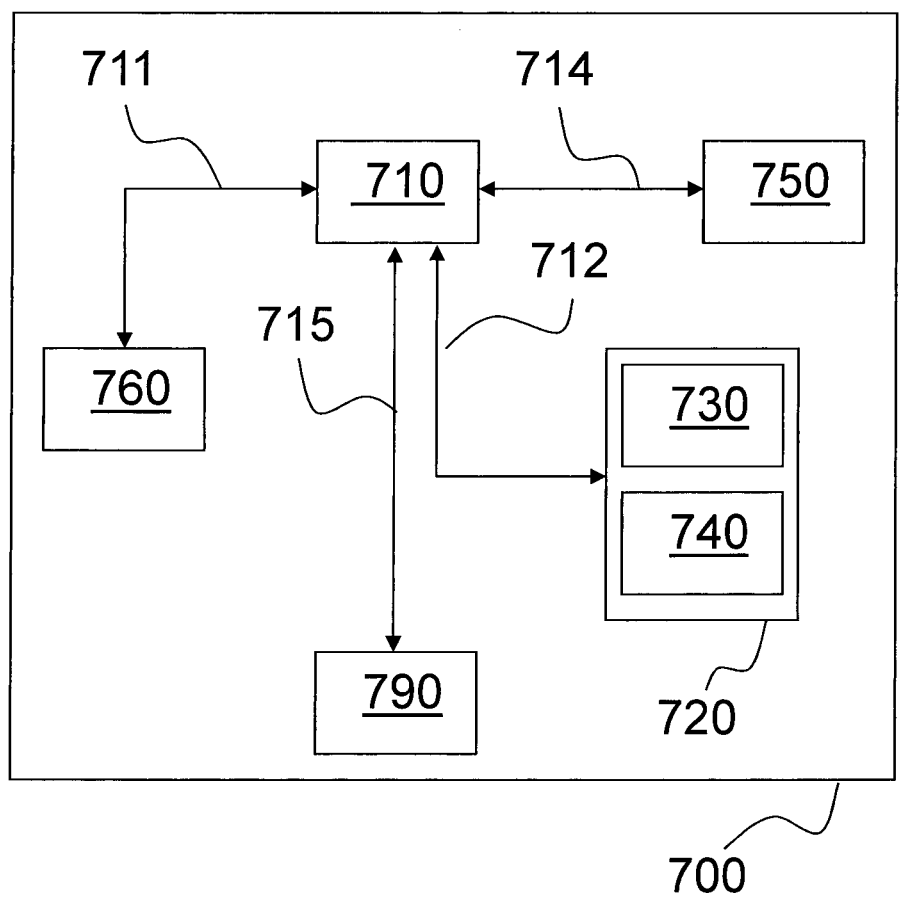
FIG. 7 shows a schematic layout of a computer system.

The present disclosure also relates to a computer program, computer program product and a storage medium for a computer all to be used with a computer for executing said method. FIG. 7 shows a schematic layout of a computer system 700 for implementing the method of the disclosure, comprising a non-volatile memory 720, a processor 710 and a read and write memory 760. The memory 720 has a first memory part 730, in which a computer program for controlling the system 700 is stored. The computer program in the memory part 730 for controlling the system 700 can be an operating system.

The system 700 can enclose, for example, a control unit, such as a data-processing unit 710. The data-processing unit 710 can comprise, for example, a microcomputer. The memory 720 also has a second memory part 740, in which a program for measuring torque according to the invention is stored. In an alternative embodiment, the program for measuring torque is stored in a separate non-volatile storage medium 750 for data, such as, for example, a CD or an exchangeable semiconductor memory. The program can be stored in an executable form or in a compressed state. When it is stated below that the data-processing unit 710 runs a specific function, it should be clear that the data-processing unit 710 is running a specific part of the program stored in the memory 740 or a specific part of the program stored in the non-volatile storage medium 750.

The data-processing unit 710 is tailored for communication with the storage memory 750 through a data bus 714. The data-processing unit 710 is also tailored for communication with the memory 720 through a data bus 712. In addition, the data-processing unit 740 is tailored for communication with the memory 760 through a data bus 711. The data-processing unit 710 is also tailored for communication with a data port 790 by the use of a data bus 715. The method according to the present invention can be executed by the data-processing unit 710, by the data-processing unit 710 running the program stored in the memory 740 or the program stored in the non-volatile storage medium 750.

Reference signs mentioned in the claims should not be seen as limiting the extent of the matter protected by the claims. Their sole function is to make claims easier to understand.

As will be realized, the disclosure is capable of modification in various obvious respects, all without departing from the scope of the appended claims. For example, although the clutch actuating position frequently has been disclosed as wear indicating clutch operating parameter the disclosure encompasses also use of other clutch operating parameters for determining need for clutch calibration. Accordingly, the drawings and the description thereto are to be regarded as illustrative in nature, and not restrictive.

The invention claimed is:

1. Method for automatic detection of need for clutch calibration, the method comprising:
   registering and storing in a data memory, before or in connection with engine shut down, a value of a clutch operating parameter;
   registering a corresponding value of the clutch operating parameter in connection with subsequent engine start up;
   determining need for clutch calibration if the difference between the stored value of the clutch operating parameter and the corresponding value of the clutch operating parameter exceeds a predetermined threshold value;
   performing an automatic clutch calibration if a need for clutch calibration has been determined;
   performing the automatic clutch calibration by updating at least one stored clutch control parameter with a value corresponding to the determined difference between the stored value of the clutch operating parameter and the corresponding value of the clutch operating parameter; and
   performing the automatic clutch calibration by updating and displacing more than one point on a stored complete clutch characteristic curve.

2. Method according to claim 1, wherein the clutch operating parameter is sensitive to a wear condition of the clutch.

3. Method according to claim 1, wherein the value of the clutch operating parameter is derived from a clutch actuating position along the clutch characteristic curve.

4. Method according to claim 3, wherein the clutch operating parameter is the clutch actuating position along the clutch characteristic curve.

5. Method according to claim 1, wherein the stored value of the clutch operating parameter is derived from any of a clutch engaged position, a clutch engagement position, or a clutch disengagement position.

6. Method according to claim 1, wherein the stored value of the clutch operating parameter is derived from a certain engagement pressure and/or a certain torque transfer value.

7. Method according to claim 6, comprising performing the automatic clutch calibration before use of the clutch for transmitting driving torque.

8. Method according to claim 7, wherein the stored clutch control parameter is any of a stored clutch engagement position, a stored clutch disengagement position or a stored clutch engaged position.

9. Method according to claim 1, comprising signalling clutch calibration need to a driver of the vehicle and/or sending information concerning clutch calibration need to a remote party if a need for clutch calibration has been determined.

10. Method according to claim 3, wherein the clutch actuating position is registered by a position sensor that is arranged to register the position of an axially displaceable pressing plate or a member of a clutch actuating mechanism that is arranged to generate the axial displacement of the pressing plate.

11. Method according to claim 1, wherein the clutch actuating position is registered by a position sensor that is arranged to register the position of an axially displaceable pressing plate or a member of a clutch actuating mechanism that is arranged to generate the axial displacement of the pressing plate, comprising controlling clutch operation without taking into account the output signal of a position sensor if a need for clutch calibration has been determined.

12. Method according to claim 1, comprising performing at least one additional disengagement-engagement sequence if the difference between the stored value of the clutch operating parameter and the corresponding value of the clutch operating parameter is within a predetermined range, and subsequently registering a new corresponding value of the clutch operating parameter.

13. Method according to claim 12, wherein the value of the clutch operating parameter is derived from or is the clutch actuating position along the clutch characteristic curve, and wherein the predetermined range is 0.3-2 millimeters.

14. Method according to claim 1, comprising registering and storing the value of the clutch operating parameter at each clutch engagement and/or disengagement occurrence.

15. Method according to claim 1, comprising regularly updating the stored the value of the clutch operating parameter based on an average value calculated using a set of recently registered values of the clutch operating parameter.

16. Method according to claim 1, wherein the predetermined threshold value is larger than 1 millimeter.

17. A computer comprising program code for performing all the steps of claim 1 when the program is run on the computer.

18. A computer program product comprising program code stored on a non-transitory computer readable medium for performing all the steps of claim 1 when the program product is run on a computer.

19. Clutch system comprising a friction clutch and an electronic control unit, wherein the control unit is programmed to automatically detect need for clutch calibration by performing the steps of:
- registering and storing in a data memory, before or in connection with engine shut down, a value of a clutch operating parameter;
- registering a corresponding value of the clutch operating parameter in connection with subsequent engine start up; and
- determining need for clutch calibration if the difference between the stored value of the clutch operating parameter and the corresponding value of the clutch operating parameter exceeds a predetermined threshold value; and
- performing an automatic clutch calibration if a need for clutch calibration has been determined;
- performing the automatic clutch calibration by updating at least one stored clutch control parameter with a value corresponding to the determined difference between the stored value of the clutch operating parameter and the corresponding value of the clutch operating parameter; and
- performing the automatic clutch calibration by updating and displacing more than one point on a stored complete clutch characteristic curve.

20. A computer system for implementing a method for automatic detection of need for clutch calibration, the method comprising
- registering and storing in a data memory, before or in connection with engine shut down, a value of a clutch operating parameter;
- registering a corresponding value of the clutch operating parameter in connection with subsequent engine start up;
- determining need for clutch calibration if the difference between the stored value of the clutch operating parameter and the corresponding value of the clutch operating parameter exceeds a predetermined threshold value; and
- performing an automatic clutch calibration if a need for clutch calibration has been determined;
- performing the automatic clutch calibration by updating at least one stored clutch control parameter with a value corresponding to the determined difference between the stored value of the clutch operating parameter and the corresponding value of the clutch operating parameter; and
- performing the automatic clutch calibration by updating and displacing more than one point on a stored complete clutch characteristic curve.

* * * * *